No. 728,103. Patented May 12, 1903.

UNITED STATES PATENT OFFICE.

FERDINAND-CHRISTOPH VON HEYDEBRAND UND DER LASA, OF NEW YORK, N. Y.

ARTIFICIAL FUEL.

SPECIFICATION forming part of Letters Patent No. 728,103, dated May 12, 1903.

Application filed July 17, 1902. Serial No. 115,951. (No specimens.)

*To all whom it may concern:*

Be it known that I, FERDINAND-CHRISTOPH VON HEYDEBRAND UND DER LASA, a citizen of the United States, residing at 161 Washington street, in the city, county, and State of New York, have invented a new and useful Improvement in Artificial Fuel, of which the following is a specification.

This invention relates to artificial fuel.

The object of the invention is to utilize a great industrial waste product—sawdust—in combination with petroleum waste, heavy oil, or sludge for the manufacture of a practical factory or steamer fuel by the addition thereto of a certain percentage of earth or clay acting both as a vehicle and binder and for retarding the combustion of the other quick-burning ingredients and bituminous substances forming the combustible base of the fuel, which would otherwise rapidly burn out without producing a sustained heat requisite for its proper use for the purpose as required. The relative proportion may be varied more or less. I may want to leave out the carbonate of magnesia under certain variable conditions of the qualities of the clay employed.

The following is the formula for attaining the above-described object of my invention: heavy coal-oil, forty per cent., eight hundred pounds; sawdust, thirty per cent., six hundred pounds; coal-tar, from five to ten per cent., one hundred to two hundred pounds; carbonate of magnesia, five pounds per ton; balance, clay or earth and bituminous substances for short ton of two thousand pounds.

Having thus described my invention, what I claim is—

As an article of manufacture an artificial fuel composed of coal-tar, coal-oil, sawdust, clay, bituminous substances and carbonate of magnesia in the proportions as above described.

In testimony whereof I, FERDINAND-CHRISTOPH VON HEYDEBRAND UND DER LASA, have signed my name to this specification, in the presence of two subscribing witnesses, this 16th day of July, 1902.

FERDINAND-CHRISTOPH VON
        HEYDEBRAND UND DER LASA.

Witnesses:
  JAMES LE MON,
  CLAUS R. VON EGLOFFSTEIN.